US009565277B2

(12) United States Patent
Visser

(10) Patent No.: US 9,565,277 B2
(45) Date of Patent: Feb. 7, 2017

(54) DUAL-HOMED EXTERNAL NETWORK ACCESS IN A DISTRIBUTED INTERNET PROTOCOL (IP) ROUTER

(71) Applicant: iPhotonix, Richardson, TX (US)

(72) Inventor: Lance Arnold Visser, Dallas, TX (US)

(73) Assignee: iPhotonix, Richardson, TX (US)

( * ) Notice: Subject to any disclaimer, the term of this patent is extended or adjusted under 35 U.S.C. 154(b) by 0 days.

(21) Appl. No.: 14/749,365

(22) Filed: Jun. 24, 2015

(65) Prior Publication Data

US 2015/0381773 A1 Dec. 31, 2015

Related U.S. Application Data

(60) Provisional application No. 62/018,443, filed on Jun. 27, 2014.

(51) Int. Cl.
| | |
|---|---|
| H04L 12/28 | (2006.01) |
| H04L 12/56 | (2006.01) |
| H04L 29/06 | (2006.01) |
| H04L 12/46 | (2006.01) |
| H04L 12/741 | (2013.01) |
| H04L 12/54 | (2013.01) |

(52) U.S. Cl.
CPC ........... *H04L 69/22* (2013.01); *H04L 12/4641* (2013.01); *H04L 45/745* (2013.01); *H04L 12/5689* (2013.01)

(58) Field of Classification Search
None
See application file for complete search history.

(56) References Cited

U.S. PATENT DOCUMENTS

| | | | | |
|---|---|---|---|---|
| 2005/0141518 A1* | 6/2005 | Schiller | ................... | H04L 49/25 370/395.31 |
| 2006/0209830 A1* | 9/2006 | Oguchi | ................... | H04L 45/00 370/392 |
| 2010/0142369 A1* | 6/2010 | Gottwerth | ............... | H04L 12/56 370/225 |
| 2010/0284407 A1* | 11/2010 | Leelanivas | .............. | H04L 45/04 370/392 |

(Continued)

OTHER PUBLICATIONS

"CPE WAN Management Protocol," TR-069, Issue 1, Amendment 5, CWMP Version 1.4, Broadband Forum, Nov. 2013, 228 pages.

*Primary Examiner* — Steven H Nguyen
*Assistant Examiner* — Rebecca Song
(74) *Attorney, Agent, or Firm* — Slater Matsil, LLP

(57) ABSTRACT

Dual-homed forwarding techniques ensure that packets destined for a private network location are forwarded directly to the private network. Host devices adapted for dual-homed forwarding techniques may first search a forwarding table to identify an outgoing interface associated with a packet's destination address, and then search an egress table to identify an entry associated with the outgoing interface. The identified entry in the egress table indicates whether the outgoing interface is a remote interface, and if so, a dual-homing identifier associated with the outgoing interface. If so, the host device searches the forwarding table a second time to determine whether any local interfaces are associated with the dual-homing identifier. The packet is then forwarded either over the local outgoing interface associated with the dual-homing identifier or the originally identified outgoing interface.

19 Claims, 15 Drawing Sheets

(56) References Cited

U.S. PATENT DOCUMENTS

| | | | | |
|---|---|---|---|---|
| 2013/0305344 A1* | 11/2013 | Alicherry | ............ | H04L 63/0272 |
| | | | | 726/12 |
| 2014/0133354 A1* | 5/2014 | Scharf | ..................... | H04L 45/42 |
| | | | | 370/254 |
| 2015/0023357 A1* | 1/2015 | Imai | .................... | H04L 12/4641 |
| | | | | 370/395.53 |
| 2015/0188943 A1* | 7/2015 | Williams | .............. | H04L 63/166 |
| | | | | 713/151 |

* cited by examiner

DUAL-HOMED EXTERNAL NETWORK ACCESS IN A DISTRIBUTED INTERNET PROTOCOL (IP) ROUTER

This patent application claims priority to U.S. Provisional Application No. 62/018,443, filed on Jun. 27, 2014 and entitled "Dual-Homed External Network Access in a Distributed Internet Protocol (IP) Router," which is hereby incorporated by reference herein as if reproduced in its entirety.

CROSS-REFERENCE TO RELATED APPLICATIONS

This patent application is related to U.S. patent application Ser. No. 14/749,081, U.S. patent application Ser. No. 14/749,163, U.S. patent application Ser. No. 14/749,231, and U.S. patent application Ser. No. 14/749,317, each of which are incorporated by reference herein as if reproduced in their entireties.

TECHNICAL FIELD

The present invention relates generally to telecommunications, and in particular embodiments, to techniques and mechanisms for dual homed external network access in a distributed internet protocol (IP) router.

BACKGROUND

Small and medium businesses (SMBs) are becoming increasingly data intensive as industries adapt to the information age. This has created a demand for cost-effective network solutions capable of efficiently delivering services across distributed locations in a secure and reliable manner. Notably, conventional enterprise networks are designed primarily for large corporations, and may be ill-suited for many SMB applications. Specifically, conventional enterprise networks typically require technical support at the network edge in order to deploy and service network equipment in remote office locations. Since many SMB clients do not employ on-site information technology (IT) personnel, the deployment and maintenance of conventional enterprise network equipment in SMB remote offices may require service calls by certified technicians, which may significantly increase the up-front and/or operational expenses of providing conventional enterprise networks to SMB clients. Accordingly, techniques and systems for providing affordable, yet capable, network solutions to SMB clients are desired.

SUMMARY OF THE INVENTION

Technical advantages are generally achieved, by embodiments of this disclosure which describe for dual homed external network access in a distributed internet protocol (IP) router.

In accordance with an embodiment, a method for dual-homed external access in a virtual edge router is provided. In this example, the method includes receiving a packet on a local area network (LAN) interface of a local host device in the virtual edge router, and searching a routing table to identify a remote outgoing interface associated with a destination address of the packet. The destination address of the packet corresponds to an external destination in a private network, and the remote outgoing interface interconnects the private network to a remote host device of the virtual edge router. The method further includes determining whether the destination address is associated with a local outgoing interface of the local host device, and forwarding the packet over the local outgoing interface of the local host device when the destination address is associated with the local outgoing interface of the local host device. An apparatus and computer program product for performing this method are also provided.

In accordance with another embodiment, a method for expedited private network re-routing in a virtual edge router is provided. In this example, the method includes receiving a packet on a local area network (LAN) interface of a local host device in the virtual edge router, and searching a routing table to identify a remote internal interface associated with a destination address of the packet. The remote internal interface is a port on a remote host device of the virtual edge router. A data tunnel interconnects a wide area network (WAN) interface of the local host device to a WAN interface of the remote host device. The data tunnel extends through a public network. The method further includes determining whether to re-route the packet over a private network that interconnected to the remote host device via a remote outgoing interface and to the local host device via a local outgoing interface, and forwarding the packet over the local outgoing interface when determining to reroute the packet over the private network. An apparatus and computer program product for performing this method are also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless other-

DETAILED DESCRIPTION OF ILLUSTRATIVE EMBODIMENTS

Figure 1A:
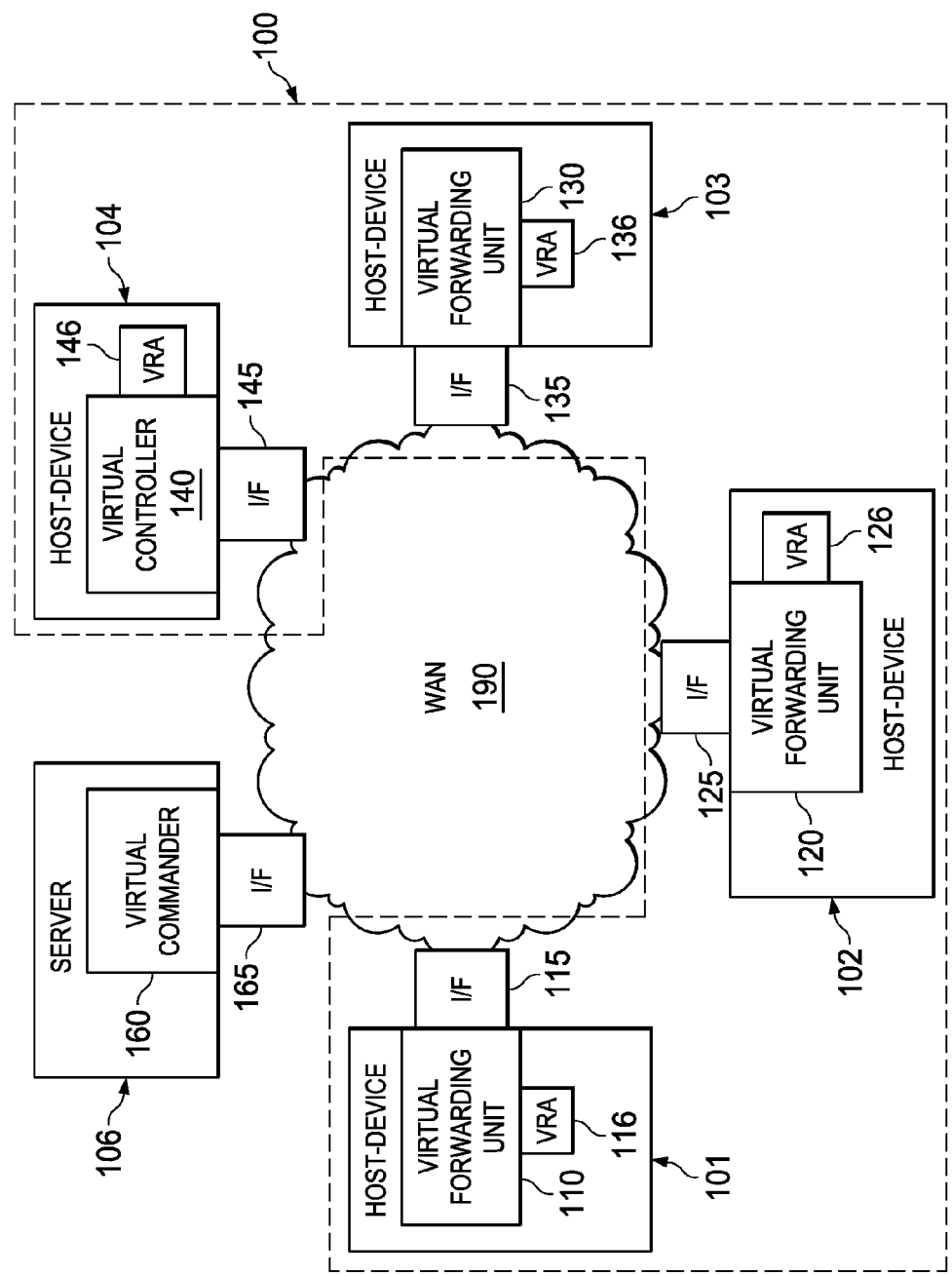
FIGS. 1A-1E illustrate diagrams of an embodiment virtual edge router network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. While much of this disclosure discusses virtual networking solutions for SMB clients, those of ordinary skill in the art will recognize that the underlying concepts are scalable to any size system, including (but not limited to) large enterprise networks. Various concepts are disclosed in U.S. Provisional Patent Application 62/018,350, U.S. Provisional Patent Application 62/018,389, U.S. Provisional Patent Application 62/018,398, U.S. Provisional Patent Application 62/018,408, U.S. Provisional Patent Application 62/018,421, U.S. Provisional Patent Application 62/018,433, U.S. Provisional Patent Application 62/018,443 are, each of which are incorporated by reference herein as if reproduced in their entireties.

Innovative virtual networking architectures are described by U.S. patent application Ser. No. 14/749,081. As described therein, virtual forwarding units may be instantiated on different host devices distributed in remote office locations of an SMB client. The virtual forwarding units may be configured to exchange packets with one another by forwarding the packets over data tunnels extending between wide area network (WAN) interfaces of the distributed host devices. The data tunnels may extend over a public internet, and packets may generally be forwarded over the data tunnels without regard to the latency and/or congestion associated with those data tunnels. For example, the virtual forwarding units may view the data tunnels as merely another extension of the virtual edge router's data plane, and therefore may not attribute transportation latencies with forwarding of packets over the tunnel. For many SMB clients, the transportation latencies may not be all that relevant, as the data tunnel extending from one host to another may (for all intents and purposes) be the most direct (and therefore fastest) route from a local source to a remote destination.

However, some SMB clients may have a private network (e.g., an multi-protocol label switching (MPLS) network) that interconnects with interfaces of two or more distributed host devices. For example, a private network may be interconnected to both a local host device and a remote host device. In such an example, packets originating at the local host device can be communicated to a destination in the private network either (i) by forwarding the packet directly from the local host device to the private network or (ii) by indirectly tunneling the packets through the remote host device to the private network. It is typically advantageous to communicate the packet directly from the local host device to the private network, as this may reduce latency in the communications session as well as reduce congestion in the virtual edge routing network. However, host devices having a default configuration may not consistently route the packets directly to the private network. More specifically, host devices having a default configuration may typically forward the packet to the first next-hop address that is found while searching the forwarding database. For example, the forwarding database maintained at the local host device may include entries associating the destination address of the packet with both the local interface of the local host device and a remote interface of the remote host device. If the entry associating the destination address with the remote interface of the host device is found first, then the local host device may stop the search, and forward the packet over the data tunnel. To avoid this, mechanisms for ensuring that packets destined for a private network location are forwarded directly to the private network are desired.

Aspects of this disclosure provide dual-homed forwarding techniques that ensure packets destined for a private network location are forwarded directly to the private network. Host devices adapted for dual-homed forwarding techniques may first search a forwarding table to identify an outgoing interface associated with a packet's destination address, and then search an egress table to identify an entry associated with the outgoing interface. The identified entry in the egress table indicates whether the outgoing interface a remote interface, and if so, a dual-homing identifier associated with the outgoing interface. If the egress table indicates that the outgoing interface is a remote interface, then the host device searches the forwarding table a second time to determine whether any local interfaces are associated with the dual-homing identifier. If so, then the packet is forwarded over the local outgoing interface associated with the dual-homing identifier. Otherwise, the packet is forwarded over the data tunnel associated with the originally identified outgoing interface. The dual-homing identifier may be an alphanumeric identifier. Embodiment dual-homed forwarding techniques are described in greater detail below.

FIGS. 1A-1D illustrate a virtual edge router 100 comprising a plurality of virtual data forwarding units 110, 120, 130, a virtual controller 140, and a plurality of virtual remote agents 116, 126, 136, 146. The virtual forwarding units 110, 120, 130, the virtual controller 140, and the virtual remote agents 116, 126, 136, 146 (referred to collectively as "virtual components") may comprise any hardware, software, or combinations thereof within the host devices 101-104. For example, one or more of the virtual components 110-146 may be a virtual machine instantiated on a corresponding one of the host devices 101-104. As another example, one or more of the virtual components 110-146 may be a dedicated hardware component (e.g., application-specific integrated circuits (ASICs), field-programmable gate arrays (FPGAs), etc.) housed by a corresponding one of the host devices 101-104. For purposes of this disclosure, an object "instantiated" on a host device refers to any instance of software and/or hardware installed-on and/or housed-by the host device. The virtual edge router 100 may be managed by a virtual commander 160, which may be instantiated on a server 106. As used herein, the term "server" may refer to any component or collection of components maintained by a managed service provider. For example, the server 106 may correspond to a network of computing devices in a cloud computing data center or in a network of distributed data centers. As shown in FIG. 1A, the host devices 101, 102, 103, 104 and the server 106 comprise wide area network (WAN) interfaces 115, 125, 135, 145, 165 (respectively) configured to communicate over a wide area network 190.

Figure 1B:
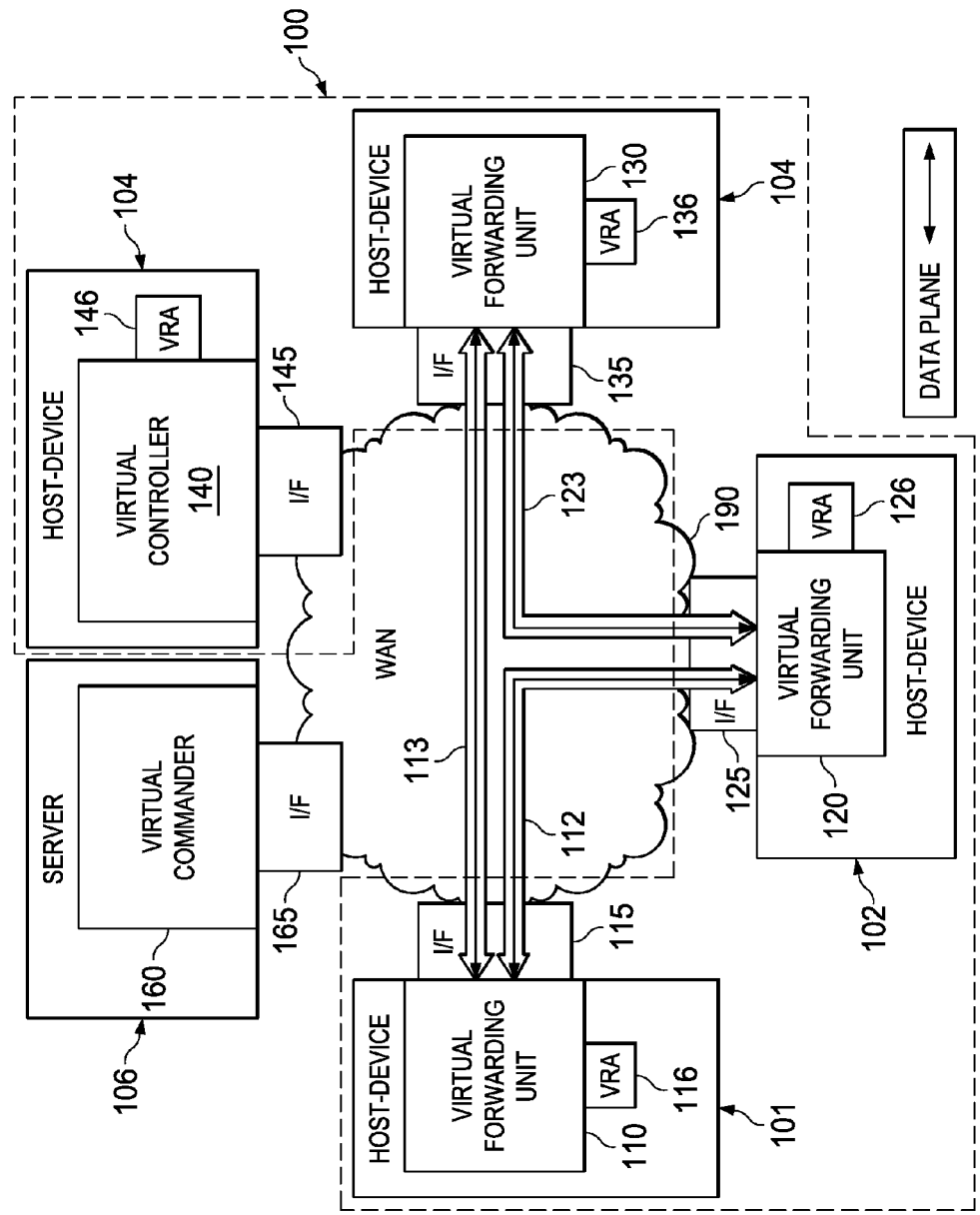

The virtual forwarding units 110-130 are data plane entities of the virtual edge router 100. The terms "virtual forwarding unit," "virtual data forwarding unit," and "virtual forwarding switch" (vFS) are used interchangeably throughout this disclosure. As shown in FIG. 1B, the virtual forwarding units 110, 120, 130 are interconnected to one another via data tunnels 112, 113, 123 extending between WAN interfaces 115, 125, 135 of the host devices 101-103. The data tunnels 112, 113, 123 collectively form a data plane of the virtual edge router 100, and correspond to virtual data pathways through the WAN 190 that are secured by a network tunneling protocol. The virtual forwarding units 110, 120, 130 may be configured to forward data packets over the data tunnels 112, 113, 123. Data packets forwarded over the data tunnels 112, 113, 123 may be transported over the WAN 190 without exiting the data plane of the virtual edge router 100. In embodiments, the virtual forwarding units 110, 120, 130 and/or or the host devices 101-103 may include LAN interfaces for communicating over a local area network with devices (e.g., computers, printers, etc.) in a remote office of an SMB client. The LAN interfaces of the virtual forwarding units 110, 120, 130 and/or or the host devices 101-103 may collectively represent LAN interfaces (or local/private interfaces) of the virtual edge router 100.

Figure 1C:
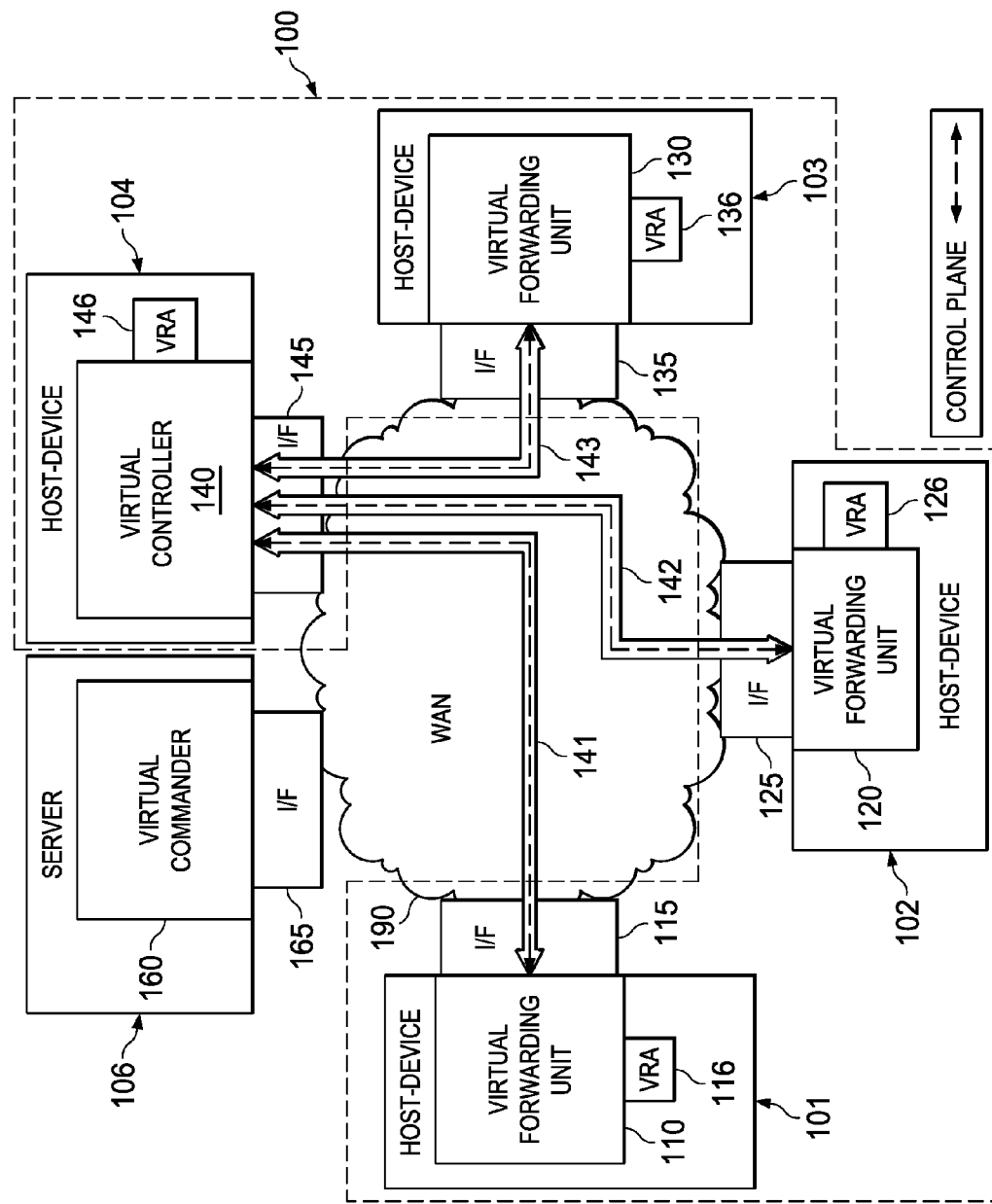

The virtual controller 140 is a control plane entity of the virtual edge router 100. The terms "virtual controller," "virtual network controller," and "virtual flow controller" (vFC) are used interchangeably throughout this disclosure. As shown in FIG. 1C, the virtual controller 140 is connected to each of the virtual forwarding units 110, 120, 130 via control tunnels 141, 142, 143 extending from the WAN interface 145 of the host device 104 to each of the WAN interfaces 115, 125, and 135 of the host devices 101-103. The control tunnels 141, 142, 143 collectively form a control plane of the virtual edge router 100. The virtual controller 140 may be configured to forward control packets over the control tunnels 141, 142, 143. Control packets forwarded over the control tunnels 141, 142, 143 may be transported over the WAN 190 without exiting the control plane of the virtual edge router 100. The virtual controller 140 may update and/or manage tables (e.g., routing, egress, etc.) in the virtual data forwarding units 110, 120, 130 via control signaling communicated over the control tunnel 141, 142, 143.

Figure 1D:
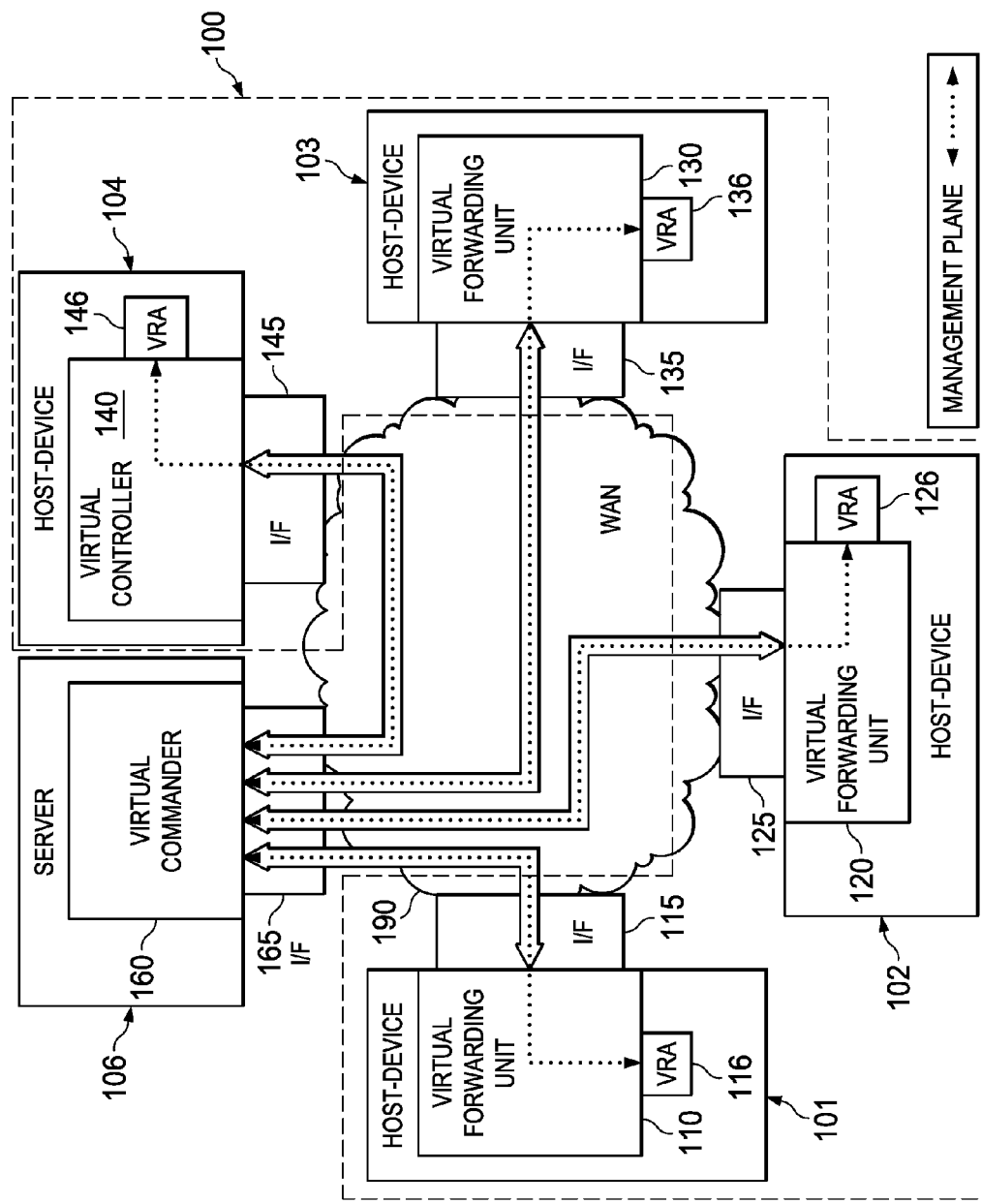

The virtual remote agents 116, 126, 136, 146 are management plane entities of the virtual edge router 100. The terms "remote agent" and "virtual remote agent" (vRA) are used interchangeably throughout this disclosure. The virtual commander 160 may be an internal management plane entity within the virtual edge router 100, or an external management device configured to manage the virtual edge router 100. The terms "virtual commander" and "virtual network commander" (vNetComm) are used interchangeably throughout this disclosure to refer to management applications in a management server. As shown in FIG. 1D, the virtual commander 160 is connected to each of the virtual remote agents 116, 126, 136, 146 via management signaling, which is transported over management tunnels 161, 162, 163 extending from the WAN interface 165 of the server 106 to each of the WAN interfaces 115, 125, 135, 145 of the host devices 101-104. The virtual remote agents 116, 126, 136, 146 and the virtual commander 160 may be configured to forward management packets over the management tunnels 161, 162, 163. Management packets forwarded over the management tunnels 161, 162, 163 may be transported over the WAN 190 without exiting the management plane of the virtual edge router 100.

Figure 1E:
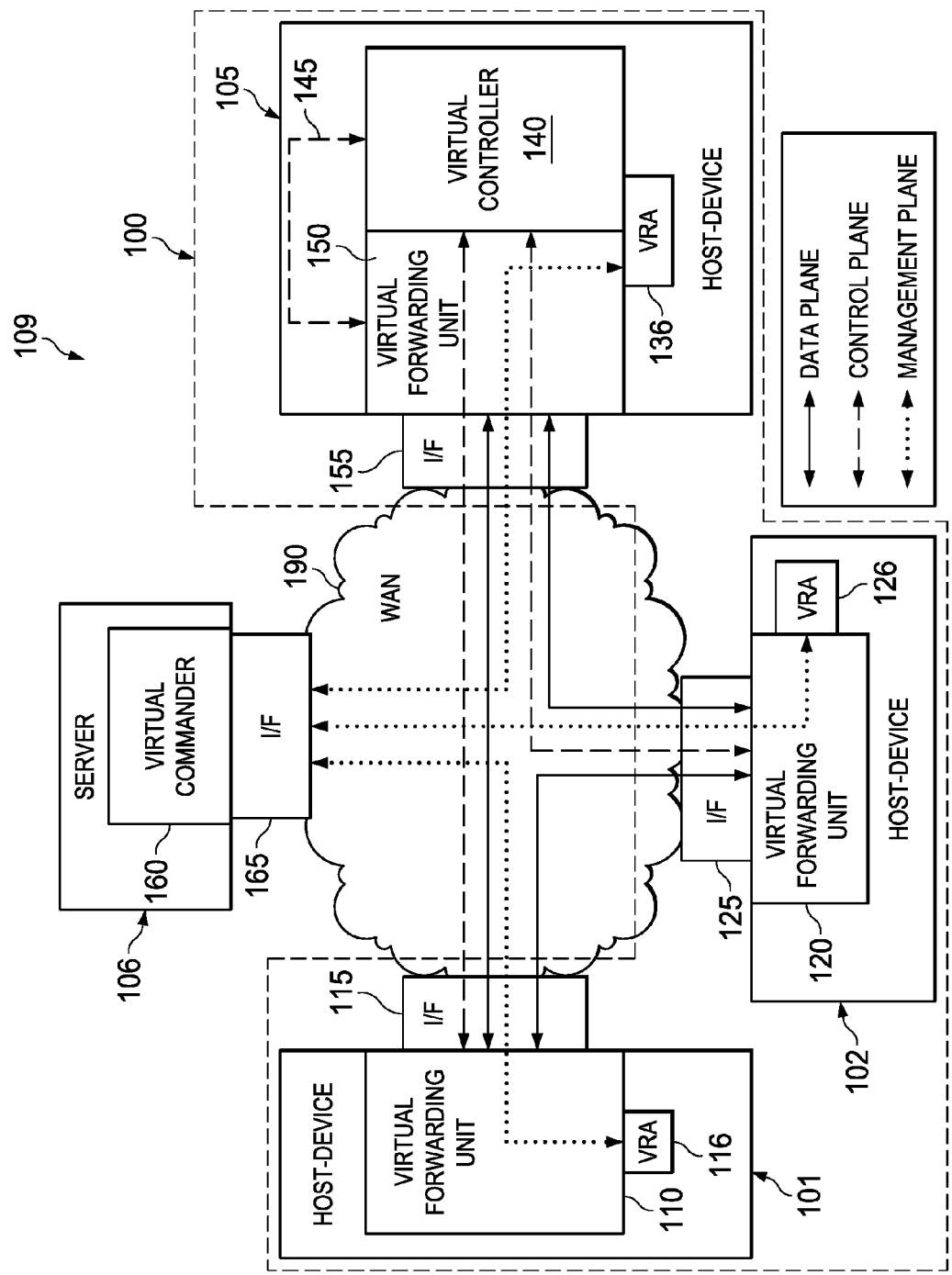

In some embodiments, a virtual controller may be co-located with a virtual forwarding unit in a common host device. FIG. 1E illustrates an embodiment virtual edge router 109 in which the virtual controller 140 and is co-located with a virtual forwarding unit 150 in a host device 105. The host device 105 includes a virtual remote agent 136 configured to manage the virtual controller 140 and the virtual forwarding unit 150. As shown, the virtual controller 140 and the virtual forwarding unit 150 share a common WAN interface 155 of the remote device, and an internal control path 145 extends between the virtual controller 140 and the virtual forwarding unit 150. While the virtual edge router 109 includes data, control, and management tunnels, those tunnels have been omitted from FIG. 1E for purposes of clarity and concision.

The data tunnels 112, 113, 123, control tunnels 141, 142, 143, and management tunnels 161, 162, 163 (referred to collectively as "tunnels") correspond to virtual pathways through the WAN 190 that are secured through one or more network tunneling protocols. In one embodiment, the same tunneling protocol is used for each of the tunnels 112-113, 123, 141-143, 161-163. In another embodiment, different tunneling protocols are used for different tunnel classifications. For example, a different tunneling protocol may be used for the data tunnels 112-113, 123 than for the control tunnels 141-143. In yet other embodiments, different tunneling protocols are used for tunnels within the same tunnel classification. For example, a different tunneling protocol may be used for the data tunnel 112 than for the data tunnel 123. Tunneling protocols may use data encryption to securely transport payloads over the WAN 190. The WAN 190 may include any wide area network or collection of wide area networks. In an embodiment, the WAN 190 corresponds to a public internet. In another embodiment, the WAN 190 corresponds to a private internet protocol (IP) network. In yet other embodiments, the WAN 190 includes a collection of public and private IP networks. The WAN 190 is not limited to IP networks, and may include networks operating under any other network delivery protocol. Unless otherwise specified, the term "wide area network" is used loosely throughout this disclosure to refer to any network (or collection of networks) that serve to interconnect two or more local area networks (LANs).

Figure 2:
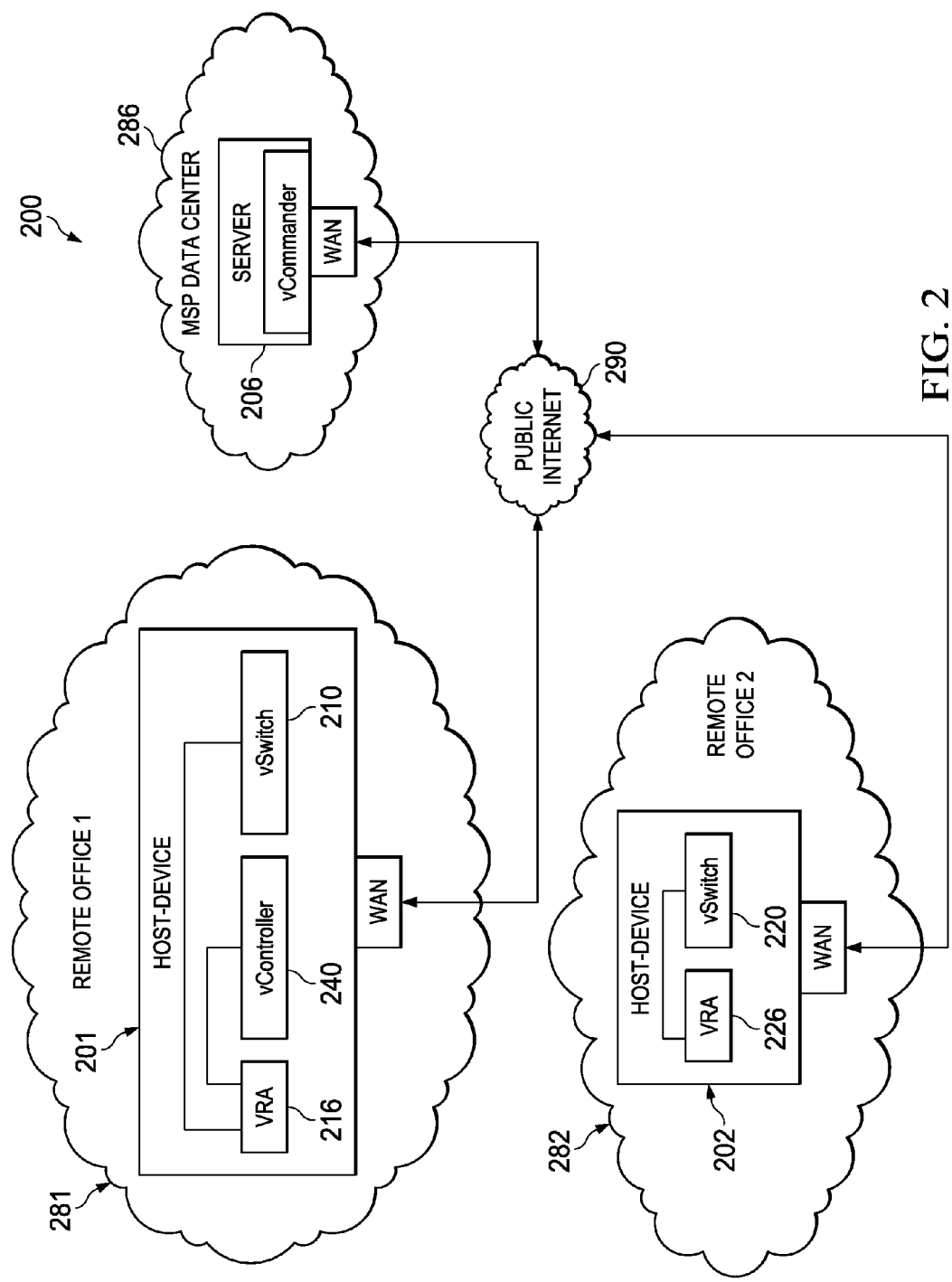
FIG. 2 illustrates a diagram of another embodiment virtual edge router network.

In some embodiments, a virtual commander may be positioned in a management facility (or network of facilities) maintained by a managed service provider (MSP), while virtual components (e.g., virtual forwarding units, virtual controller, virtual remote agent, etc.) may be instantiated on host devices distributed across multiple remote office locations of an SMB client. FIG. 2 illustrates a virtual edge router 200 comprising a virtual data forwarding unit 210, a virtual remote agent 216, and a virtual controller 240 instantiated on a host-device 201 in a remote office 281, and a virtual data forwarding unit 220 and a virtual remote agent 226 instantiated on a host-device 202 in a remote office 282. The remote offices 281, 282 are interconnected with one another, as well as with a server 206 in a managed service provider data center 286, via a public internet 290. As discussed herein, remote office locations housing a virtual controller are referred to as head-office locations, while remote office locations housing a virtual forwarding switch (but not a virtual network controller) are referred to as branch-office locations.

Figure 3:
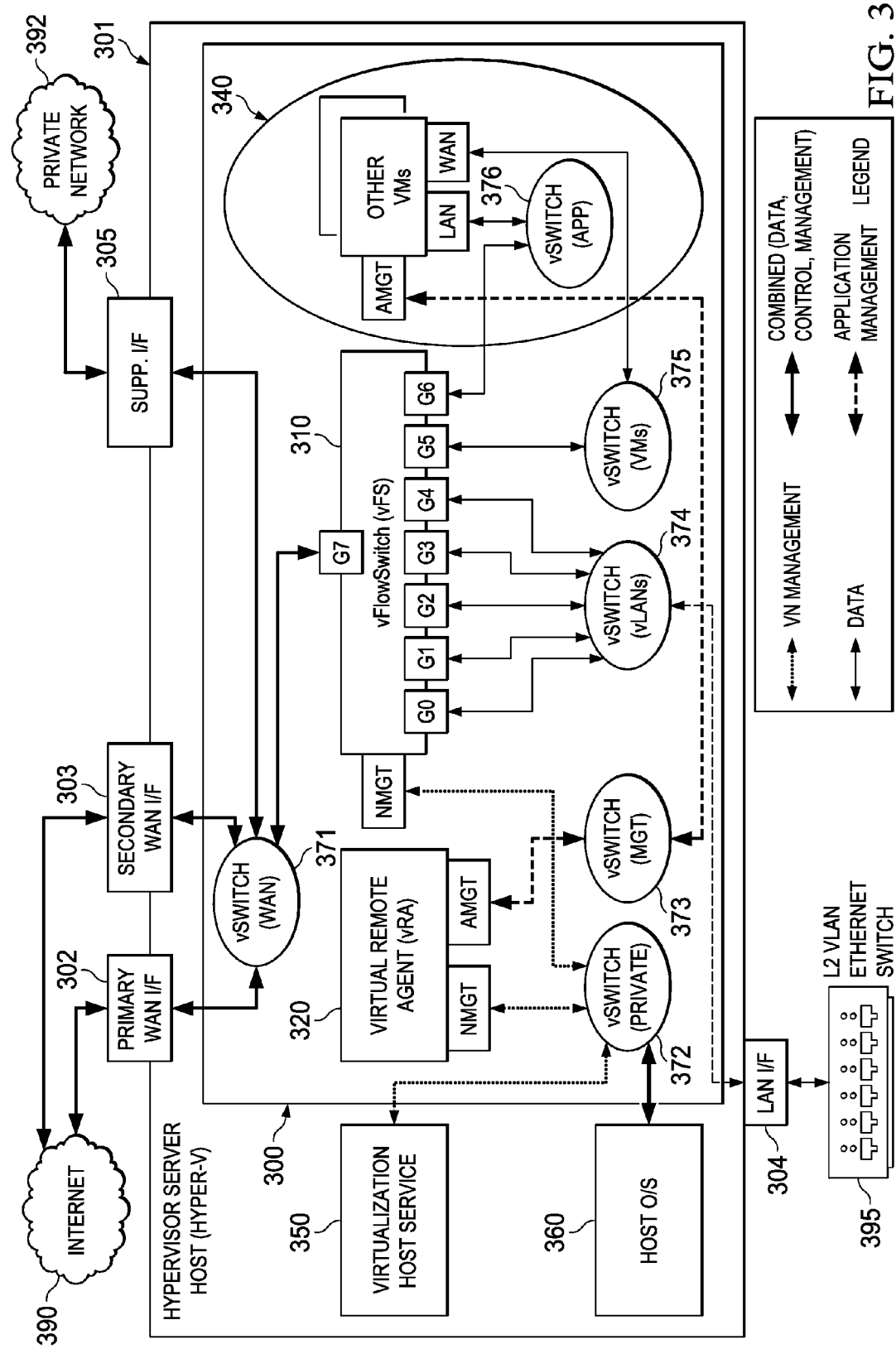
FIG. 3 illustrates a diagram of an embodiment virtual architecture for a distributed host device.

Embodiments of this disclosure provide virtual architectures for distributed host devices. FIG. 3 illustrates an embodiment virtual architecture 300 for a distributed host device 301 positioned in a branch office of a SMB client. As shown, the host device 301 includes a primary WAN interface 302 and a secondary WAN interface 303 configured to communicate over the internet 390, a LAN interface 304 configured to communicate with internal destinations via a virtual LAN (VLAN) Ethernet switch 395, and a supplemental interface 305 configured to communicate over a private network, e.g., a multi-protocol label switching (MPLS) network 392, etc. The host device 301 includes a virtual flow switch 310, a virtual remote agent 320, a plurality of virtual machines 340, and a virtualization host service 350, which are collectively referred to as virtual components 310-350. The virtual components 310-350 and a host operating system 360 are interconnected via links and virtual switches 371-376. These links are classified as combined links, data links, virtual network (VN) management links, and application management links, as indicated by the legend. Other link classifications may also be included in the virtual architecture 300.

Figure 4:
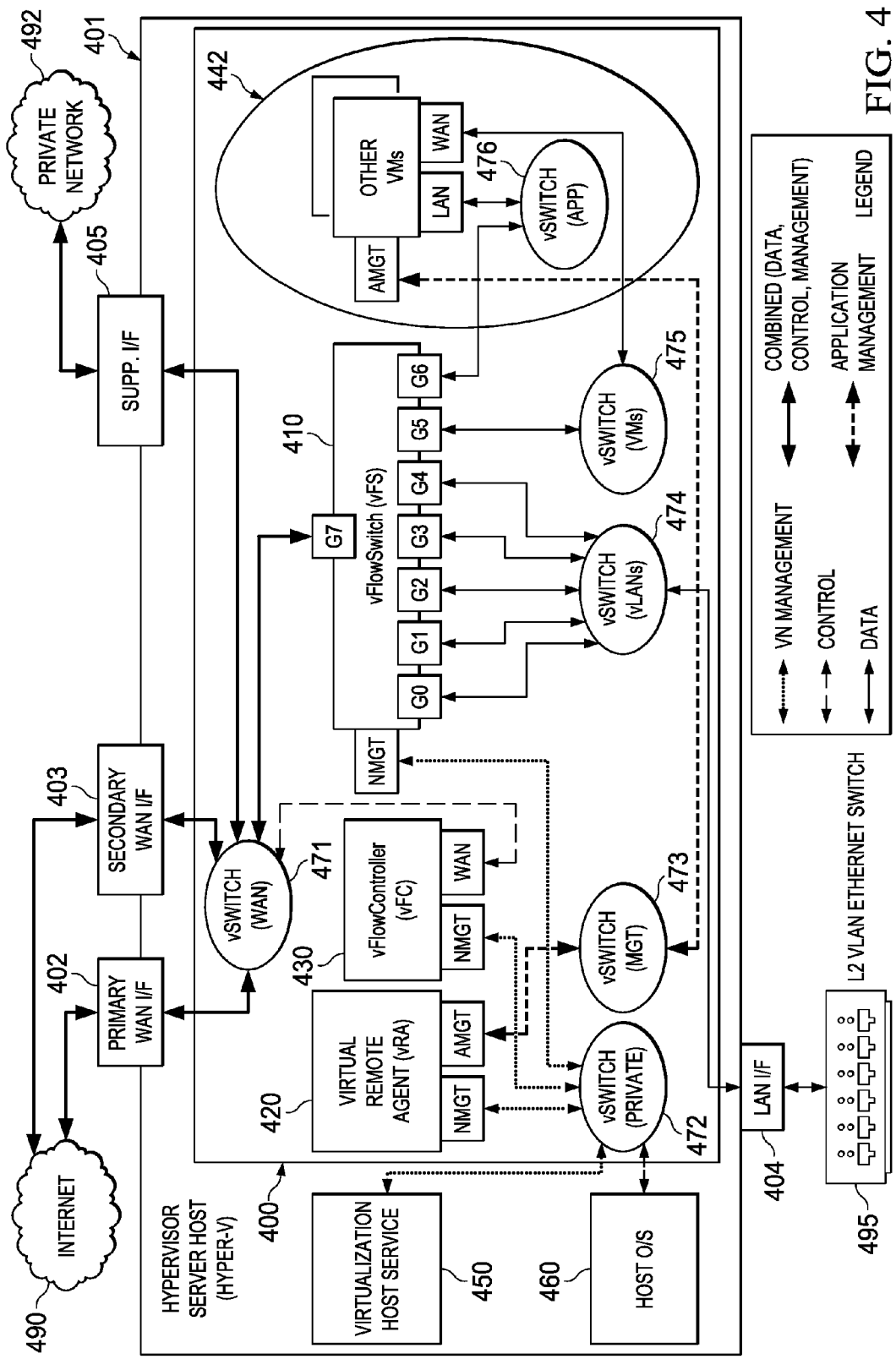
FIG. 4 illustrates a diagram of another embodiment virtual architecture for a distributed host device.

FIG. 4 illustrates an embodiment virtual architecture 400 for a distributed host device 401 positioned in a head office of an SMB client. As shown, the host device 401 includes a primary WAN interface 402 and a secondary WAN interface 403 configured to communicate over the internet 490, a LAN interface 404 configured to communicate with internal destinations via a virtual LAN (VLAN) Ethernet switch 495, and a supplemental interface 405 configured to communicate over a private network 492, e.g., a multi-protocol label switching (MPLS) network, etc. The host device 401 includes a virtual flow switch 410, a virtual remote agent 420, a virtual controller 430, a plurality of virtual machines 440, and a virtualization host service 450, which are collectively referred to as virtual components 410-450. The virtual components 410-450 and a host operating system 460 are interconnected via links and virtual switches 471-476. The links interconnecting the virtual components 410-460 and the host operating system 460 are classified as combined links, data links, control links, VN management links, and application management links, as indicated by the legend. Other link classifications may also be included in the virtual architecture 400.

The combined data links in the virtual architectures 300, 400 may include each of the other link classifications. For example, the combined data links in the virtual architectures 300, 400 may include a multiplexed combination of data links, control links, virtual network (VN) management links, and application management links. The data links may carry data in the virtual edge network. The data may include incoming data communicated from an external source (e.g., from the internet 390, 490) to an internal destination (e.g., device connected to Ethernet switch 395, 495), as well as outgoing data communicated from an internal source to an external destination. The data may also include internal data communicated from an internal source to an internal destination. The control links may carry control signaling in the virtual edge network. Control signaling may include signaling communicated from the virtual controller 430 to other virtual machines in the virtual edge network, e.g., the virtual flow switches 310, 410, etc., and vice-versa. The VN management links and application management links may carry management signaling in the virtual edge network. Management signaling may include signaling communicated from a virtual commander to one of the virtual remote agents 320, 420, as well as signaling instructions communicated from the virtual remote agents 320, 420 to other virtual machines in the virtual edge network.

Figure 5:
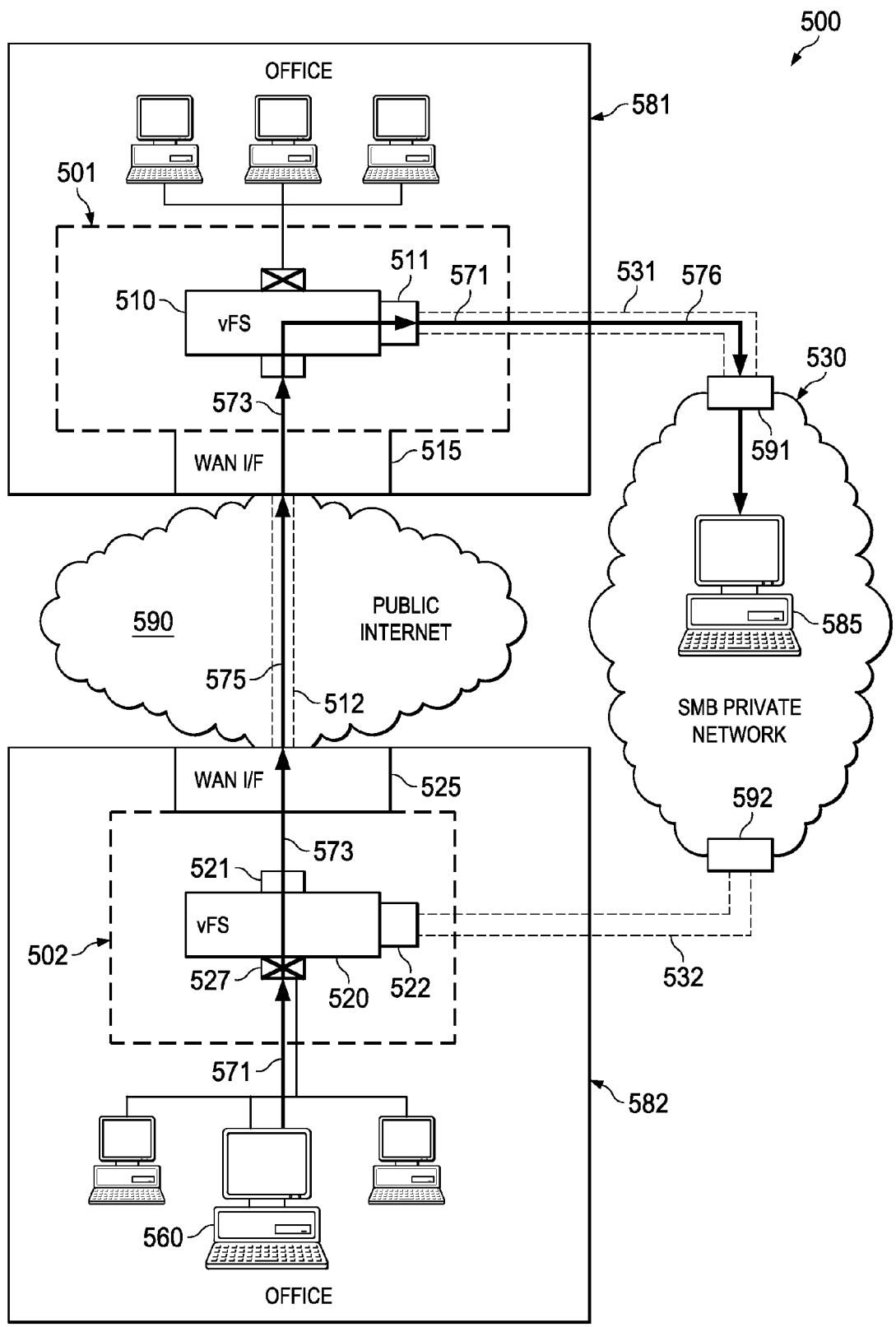
FIG. 5 illustrates a diagram of a virtual edge router adapted for default egress traffic forwarding.

As mentioned above, host devices having default configurations may search a forwarding table based on the destination address of a packet, and forward the packet to the first outgoing interface identified during the search. FIG. 5 illustrates a virtual edge routing network 500 configured to communicate outgoing traffic to a private network 530. As shown, the virtual edge routing network 500 includes virtual forwarding units 510, 520 instantiated on a remote host device 501 and a local host device 502 (respectively) positioned in remote-office locations 581, 582 of an SMB client. The remote-office locations 581, 582 may be head-office or branch-office locations of the SMB client. The virtual forwarding units 510, 520 are configured to communicate with one another over a data tunnel 512 extending through a public internet 590. The data tunnel 512 interconnects WAN interfaces 515, 525 of the remote host device 501 and the local host device 502. The virtual forwarding units 510, 520 are further configured to communicate with an SMB private network 530 via outgoing interfaces 531, 532 (respectively). The outgoing interface 531 interconnects an outgoing port 511 of the virtual host device 510 with an edge node 591 of the SMB private network 530, while the outgoing interface 532 interconnects an outgoing port 522 of the virtual forwarding unit 520 with an edge node 592 of the SMB private network 530.

In this example, a local device 560 sends a packet 571 to a local area network (LAN) interface 527 of the virtual forwarding unit 520. The packet 571 specifies an address of an external destination 585 as a destination address of the packet 571. Upon receiving the packet 571, the virtual forwarding unit 520 searches a forwarding database based on the destination address of the packet 571. The forwarding table includes a first entry associating the destination address with the outgoing interface 531 and a second entry associating the destination address with the outgoing interface 532.

The virtual forwarding unit 520 stops searching the forwarding table upon identifying the first entry associating the destination address with the outgoing interface 531, and forwards the packet 571 over the data tunnel 571 to the remote host device 501. More specifically, the virtual forwarding unit 520 encapsulates the packet 571 with a header to obtain the encapsulated packet 573, which specifies the IP address of the port 511 as the next-hop address of the encapsulated packet 573. The encapsulated packet 573 is then forwarded from the WAN port 521 of the virtual forwarding unit 520 to the WAN interface 525 of the local host device 502, where the encapsulated packet 573 is further encapsulated to obtain a tunneled packet 575. The tunneled packet 575 specifies an IP address assigned to the WAN interface 515 as the next-hop/destination address of the tunneled packet 575, and is forwarded over the data tunnel 512 to the remote host device 501. The tunneled packet 575 is then de-encapsulated at the WAN interface 515 of the remote host device 501 to re-obtain the encapsulated packet 573, which is forwarded (based on its next-hop address) to the outgoing port 511 of the virtual data forwarding unit 510. The encapsulated packet 573 is then re-encapsulated to obtain the packet 576, which is forwarded over the outgoing interface 531 to the SMB private network 530. Notably, indirectly tunneling of the packet 571 to the remote host device 501 may introduce latency into the communication session, as well as increase congestion in the virtual edge routing network 500.

Figure 6:
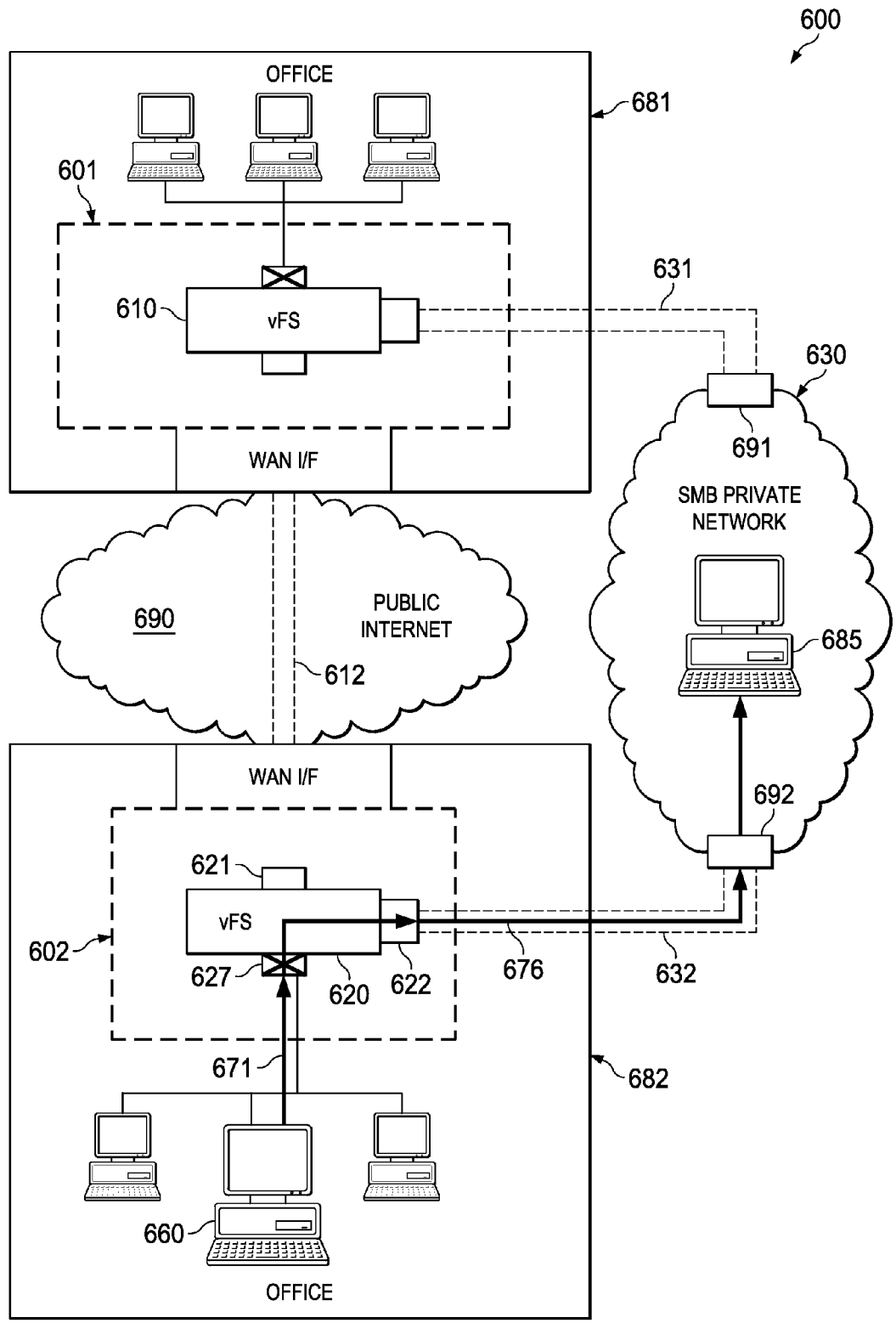
FIG. 6 illustrates a diagram of an embodiment virtual edge router adapted for dual-homed egress traffic forwarding.

Aspects of this disclosure provide dual-homed forwarding techniques that ensure outgoing packets are forwarded directly from distributed host devices over private networks. FIG. 6 illustrates an embodiment virtual edge routing network 600 adapted for dual-homed forwarding. As shown, the virtual edge routing network 600 includes virtual forwarding units 610, 620 instantiated on a remote host device 601 and a local host device 602 (respectively) positioned in remote-office locations 681, 682 of an SMB client. The remote host device 601 and the local host device 602 may be configured similarly to corresponding devices in the virtual edge routing network 500. For example, the remote host device 601 and the local host device 602 may be configured to communicate with one another via a data tunnel 612 extending through a public internet 690. The remote host device 601 and the local host device 602 may also be configured to communicate with an SMB private network 630 via outgoing interfaces 631.

However, unlike the local host device 502 in the virtual edge routing network 500, the local host device 602 may be adapted for dual-homed forwarding. For example, the local host device 602 may receive a packet 671 from the local device 660 that is destined for the external destination 685, and forward the packet 671 directly over the local outgoing interface 632 to the SMB private network 630. More specifically, the virtual forwarding unit 620 receives the packet 671 from the local device 660 over the LAN interface 627, and searches a forwarding database based on the destination address of the packet 671. The forwarding table includes a first entry associating the destination address with the outgoing interface 631 and a second entry associating the destination address with the outgoing interface 632. The virtual forwarding unit 620 initially identifies the first entry associating the destination address with the outgoing interface 631. However, before forwarding the packet, the virtual forwarding unit 620 searches an egress table based on the outgoing interface 631. The egress table identifies the outgoing interface 631 as a remote outgoing interface, and associates a dual-homing identifier with the outgoing interface 631. The dual-homing identifier may be any mechanism for cross-citing outgoing interfaces capable of forwarding traffic to the same external destination. The virtual forwarding unit 620 then searches the forwarding table once again to see if any local interfaces are associated with the dual-homing identifier. In this case, the virtual forwarding unit 620 determines that the local outgoing interface 632 is associated with the dual-homing identifier, and proceeds to forward the packet 671 over the local outgoing interface 632. More specifically, the virtual forwarding unit 620 encapsulates the packet 671 with a header to obtain the encapsulated packet 676, and then forwards the encapsulated packet 676 directly over the outgoing port 622 to the edge node 692 of the SMB private network 630. The edge node 692 relays the packet to the external destination 685.

Figure 7:
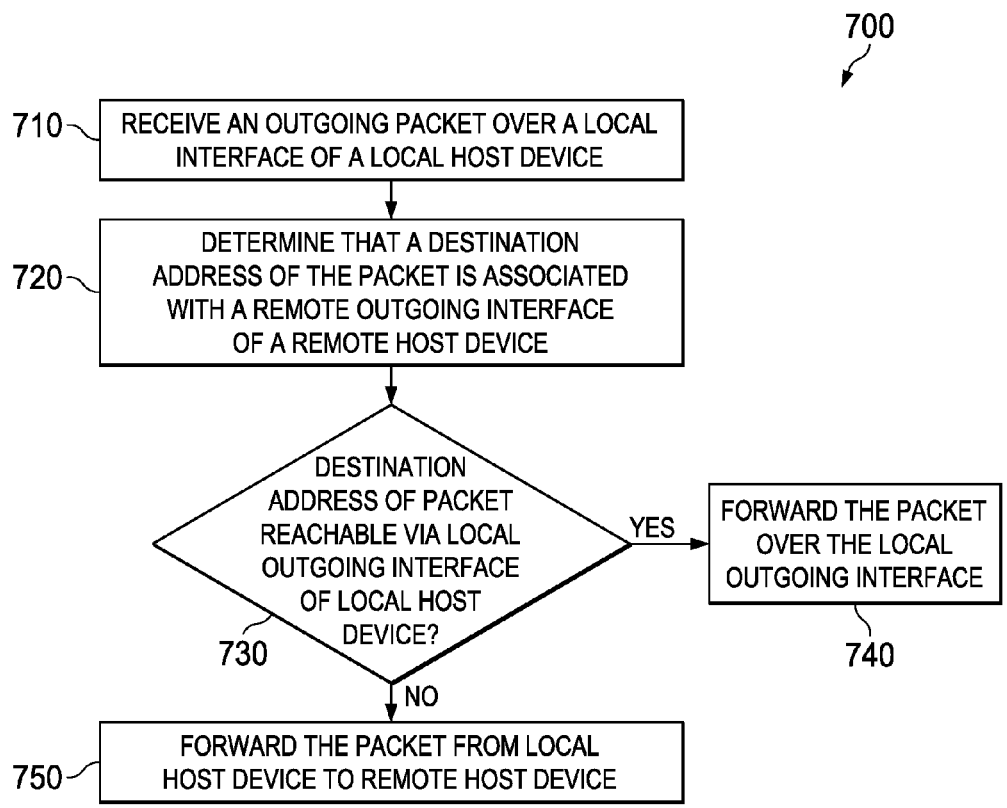
FIG. 7 illustrates a flowchart of an embodiment method for performing dual-homed egress traffic forwarding.

Aspects of this disclosure provide methods for performing dual-homed forwarding at distributed host devices. FIG. 7 illustrates an embodiment method 700 for dual-homed forwarding, as might be performed by a local host device. As shown, the method 700 begins at step 710, where the local host device receives an outgoing packet over a local area network (LAN) interface of the local host device. Thereafter, the method 700 proceeds to step 720, where the local host device determines that a destination address of the packet is associated with a remote outgoing interface of a remote host device. This step may include searching a routing table based on a destination address of the packet to identify the outgoing interface, as well as searching an egress table to determine that the outgoing interface is a remote interface.

Next, the method 700 proceeds to step 730, where the local host device determines whether the destination address of the packet is reachable via a local outgoing interface of the local host device. This step may include identifying a dual homing identifier associated with the remote outgoing interface in an egress table, and searching the forwarding table to determine whether any local interfaces are associated with the dual homing identifier. If the destination address of the packet is reachable via a local outgoing interface of the local host device, then the packet is forwarded over the local interface at step 740. Otherwise, the packet is forwarded from the local host device to the remote host device at step 750.

Figure 8:
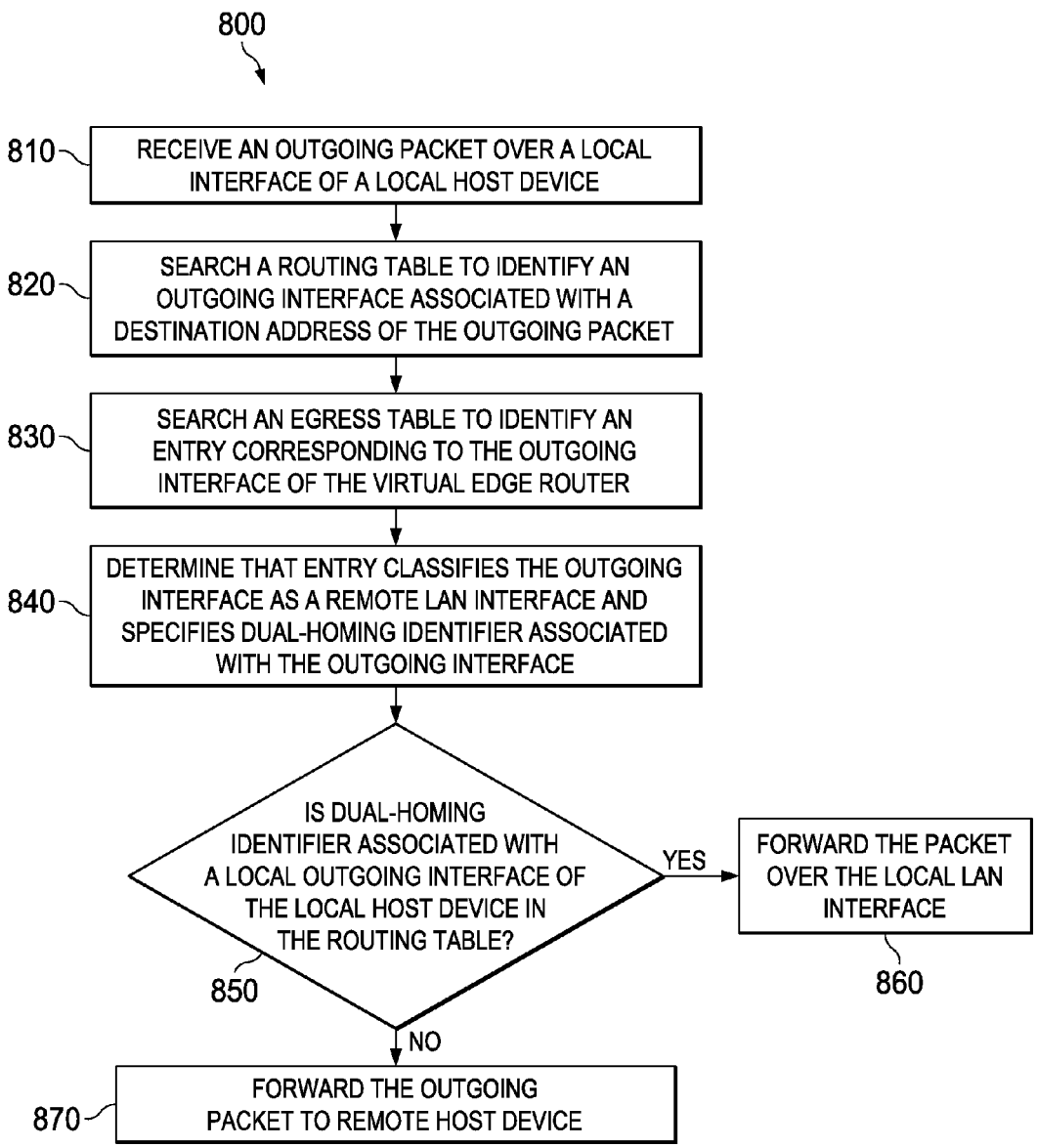
FIG. 8 illustrates a flowchart of another embodiment method for performing dual-homed egress traffic forwarding.

FIG. 8 illustrates an embodiment method 800 for performing dual-homed forwarding at a local host device. As shown, the method 800 begins with step 810, where the local host device receives an outgoing packet over a LAN interface of the local host device. Next, the method 800 proceeds to step 820, where the local host device searches a routing table to identify an outgoing interface associated with a destination address of the outgoing packet.

Thereafter, the method 800 proceeds to step 830, where the local host device searches an egress table to identify an entry corresponding to the outgoing interface of the virtual edge router. Next, the method 800 proceeds to step 840, where the local host device determines that the entry in the egress table classifies the outgoing interface as a remote LAN interface. The entry in the egress table may also specify a dual homing identifier associated with the outgoing interface.

Subsequently, the method 800 proceeds to step 850, where the local host device determines whether the dual homing identifier is also associated with a local outgoing interface of the local host device in the routing table. If the dual homing identifier is associated with a local outgoing interface of the local host device, then the packet is forwarded over the local interface at step 860. Otherwise, the packet is forwarded from the local host device to the remote host device at step 870.

Aspects of this disclosure also provide expedited private network routing of intra-network packets. More specifically, host devices having a default configuration may generally be configured to forward packets destined for a remote internal interface of a virtual edge router over a data tunnel associated with the internal interface. However, there may be some instances in which it is more efficient to re-route packets destined for remote internal interfaces over a private network, rather than the data tunnel. For example, the private network may offer better connection speeds or enhanced security.

Figure 9:
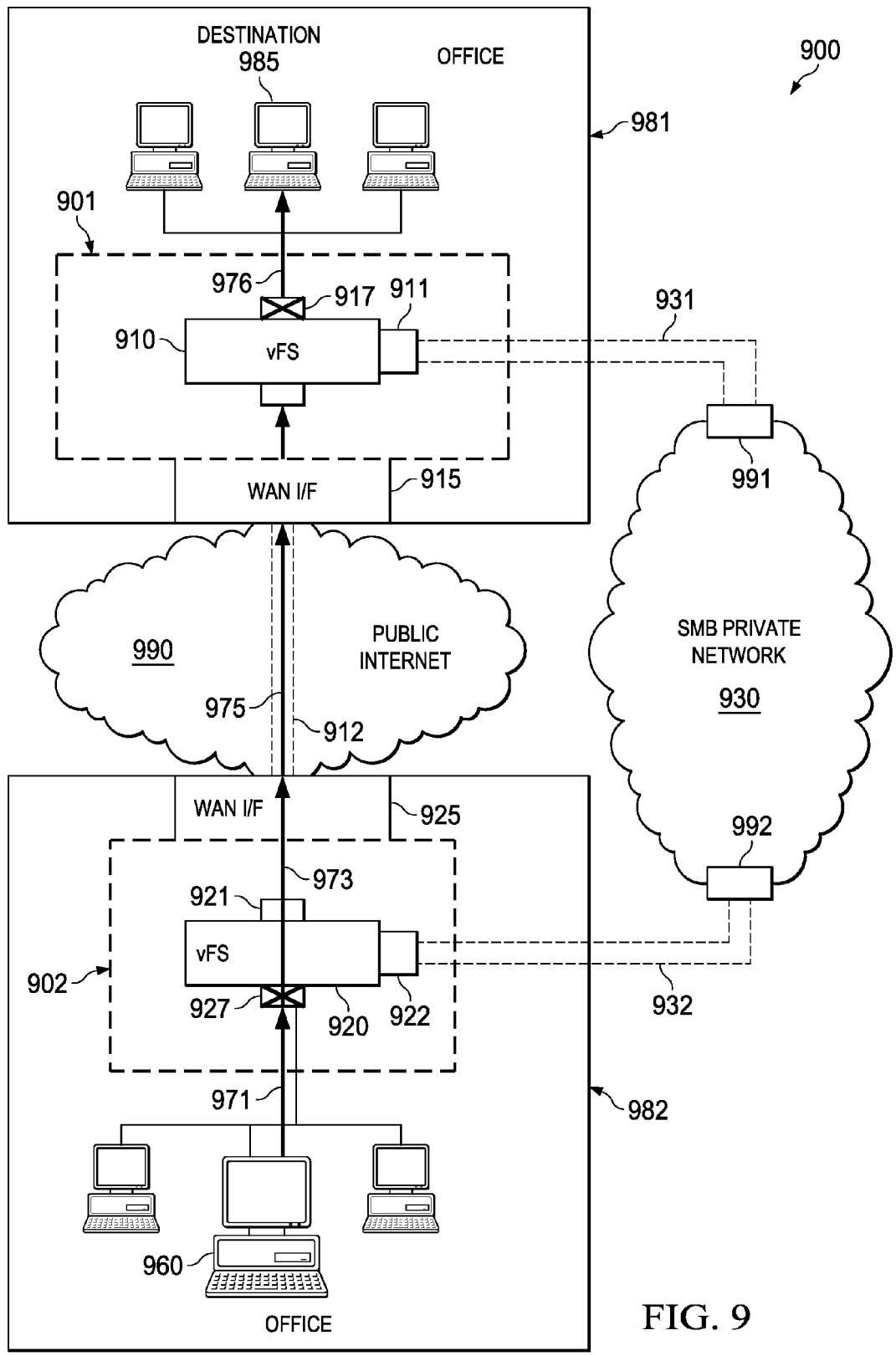
FIG. 9 illustrates a diagram of a virtual edge router adapted for default forwarding of internal network data.

FIG. 9 illustrates an embodiment virtual edge routing network 900 adapted to communicate internal data over data tunnels per a default configuration of host devices. As shown, the virtual edge routing network 900 includes virtual forwarding units 910, 920 instantiated on a remote host device 901 and a local host device 902 (respectively) positioned in remote-office locations 981, 982 of an SMB client. The remote host device 901 and the local host device 902 may be configured similarly to corresponding devices in the virtual edge routing network 500.

In this example, the virtual forwarding unit 920 receives a packet 971 from the local device 960 over the LAN interface. The packet 971 is destined for the remote internal destination 985. The virtual forwarding unit 920 identifies the remote internal interface 917 as being associated with the destination address of the packet 971, and then forwards the packet 971 directly over the data tunnel 912 to the remote device 901. More specifically, the virtual forwarding unit 920 receives the packet 971 from the local device 960 over the LAN interface 927, and searches a forwarding database based on the destination address of the packet 971. The virtual forwarding unit 920 determines that the forwarding table associates the destination address with the remote internal interface 917, and encapsulates the packet 971 with a header to obtain the encapsulated packet 973. The encapsulated packet 973 specifies the IP address of the remote internal interface 917, and is forwarded from the WAN port 921 of the virtual forwarding unit 920 to the WAN interface 925 of the local host device 902. The encapsulated packet 973 is appended with a tunneling header at the WAN interface 925 to obtain a tunneled packet 975, which specifies an IP address assigned to the WAN interface 915 as the next-hop/destination address of the tunneled packet 975. The tunneled packet is then forwarded over the data tunnel 912 to the remote host device 901, where it is then de-encapsulated to re-obtain the encapsulated packet 973. The encapsulated packet 973 is then forwarded to the remote internal interface 917, where it is re-encapsulated to obtain the packet 976. The packet 976 is then forwarded to the remote internal destination 985.

Figure 10:
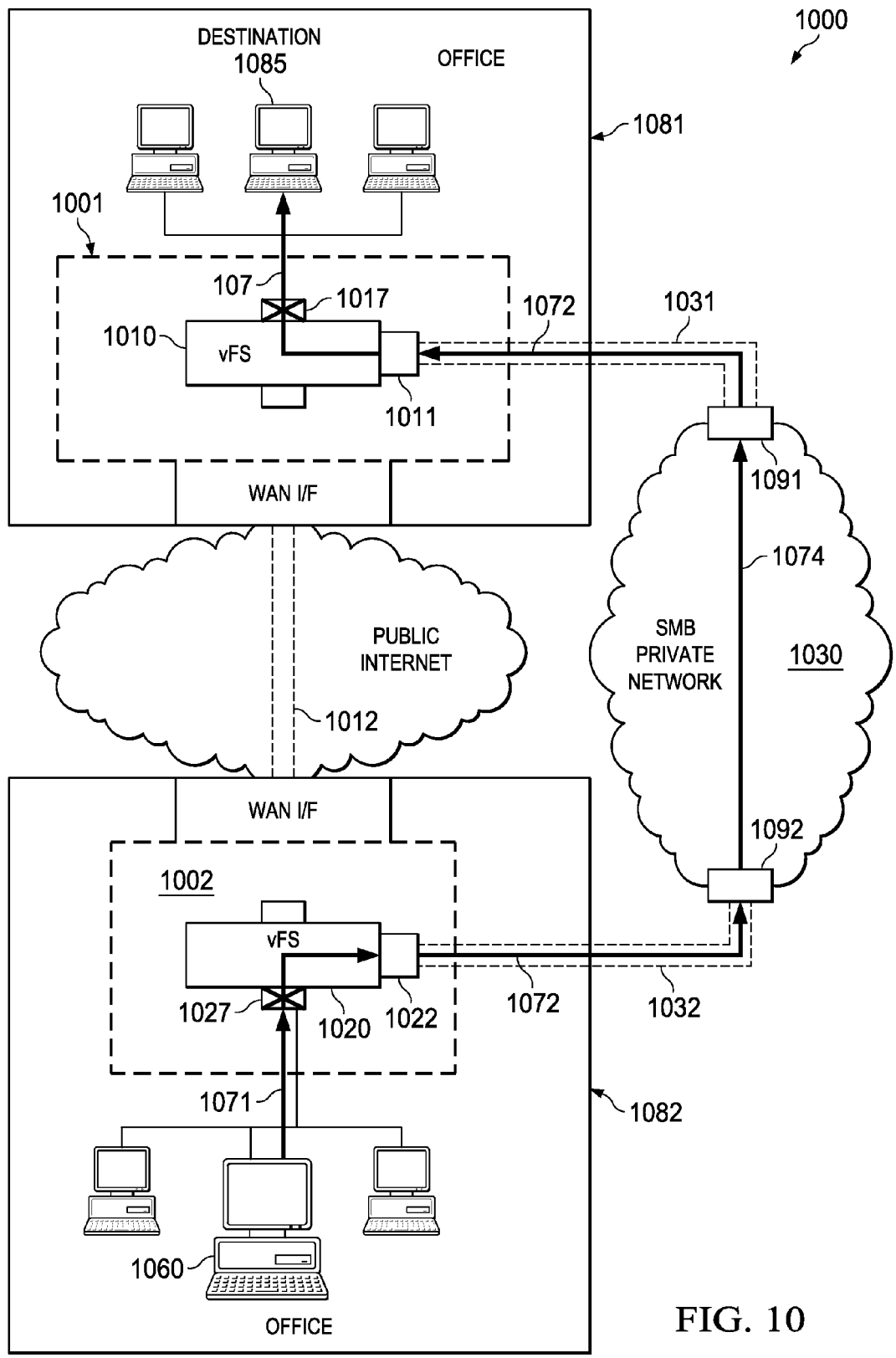
FIG. 10 illustrates a diagram of an embodiment virtual edge router adapted for expedited private network routing.

In many instances, forwarding internal data over the data tunnels may be the fastest, and most direct, route for communicating the traffic from a local source to a remote internal destination. However, in some situations, it may be more efficient to re-route internal data packets over a private network, e.g., when the public internet connection is slow, etc. FIG. 10 illustrates an embodiment virtual edge routing network 1000 adapted for expedited private network routing. As shown, the virtual edge routing network 1000 includes virtual forwarding units 1010, 1020 instantiated on a remote host device 1001 and a local host device 1002 (respectively) positioned in remote-office locations 1081, 1082 of an SMB client. The remote host device 1001 and the local host device 1002 may be configured similarly to corresponding devices in the virtual edge routing network 900. Notably, the local host device 1002 may be configured for expedited private network routing.

In this example, the local host device 1002 receives a packet 1071 destined for the remote internal destination 1085, and reroutes the packet 1071 over the SMB private network 1030. More specifically, the virtual forwarding unit 1020 receives the packet 1071 over the LAN port 1027, and determines that a destination address of the packet 1071 is associated with the remote internal interface 1017. The virtual forwarding unit 1020 then determines whether or not it is appropriate to re-route the packet 1071 over the SMB private network 1030. This determination may be made based on various factors, including (for example) the speed of the public internet connection, the congestion of the private SMB network 1030, and/or the payload size of the packet 1071. In this case, the virtual forwarding unit 1020 determines that expedited private network re-routing is appropriate. Thereafter, the virtual forwarding unit 1020 encapsulates the packet 1071 to obtain the encapsulated packet 1072, which specifies an address assigned to the port 1011 as a destination address of the encapsulated packet 1072, and forwards the encapsulated packet 1072 over the outgoing interface 1032. The encapsulated packet 1072 is then encapsulated within a transport packet 1074 at the edge node 1092, and forwarded over the SMB private network 1030 to the edge node 1091. The encapsulated packet 1072 is then removed from the transport packet 1074, and forwarded to the host device 1001. Upon being received at the host device 1001, the packet 1072 is de-capsulated to obtain the packet 1071, which is forwarded to the remote internal destination 1085.

Figure 11:
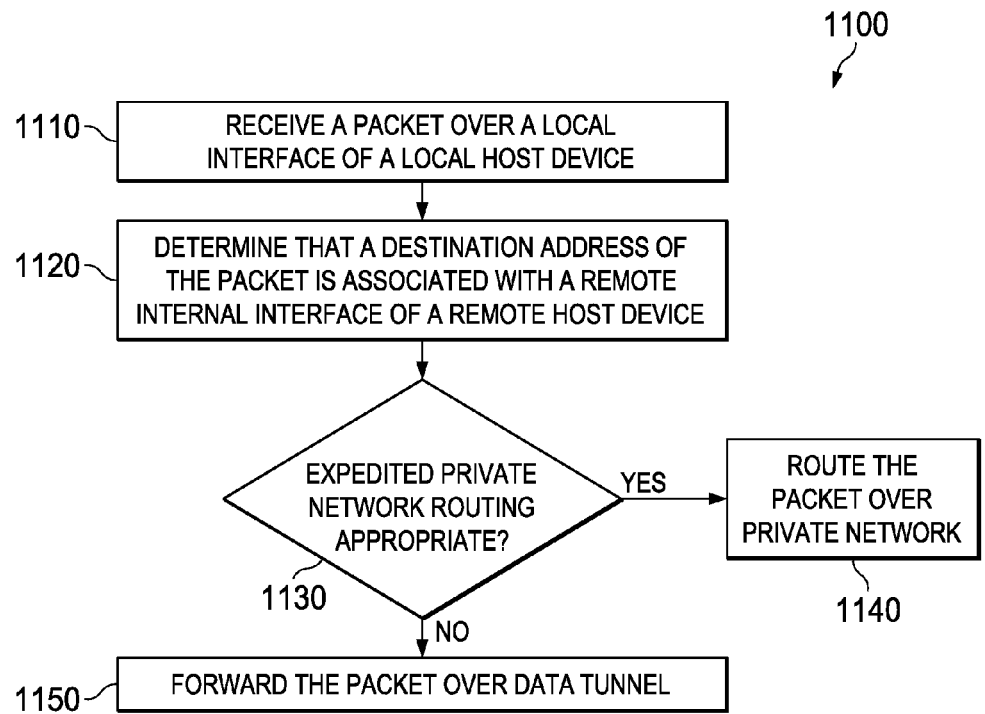
FIG. 11 illustrates a flowchart of an embodiment method for expedited private network routing.

FIG. 11 illustrates an embodiment method 1100 for expedited private network routing of intra-network packets. As shown, the method 1100 begins with step 1110, where a packet is received over a local interface of a local host device. The packet carries intra-network data that is being communicated from the local source device to a remote internal destination of the virtual edge router. Thereafter, the method 1100 proceeds to step 1120, where the local host device determines that the destination address of the packet is associated with a remote internal interface of a remote host device. Thereafter, the method 1100 proceeds to step 1120, where the local host device determines whether expedited private network routing is appropriate. In some embodiments, this may include determining whether a private network interconnects the local host device with the remote host device. This step may further include determining whether the network conditions warrant expedited private network routing, e.g., congestion level of public internet, congestions level of private network, etc.

If the local host device determines that expedited private network routing is appropriate, then the packet is routed to the remote host device via the private network at step 1140. Otherwise, if expedited private network routing is deemed not to be appropriate, then the packet is forwarded to the remote host device via the data tunnel at step 1150.

Figure 12:
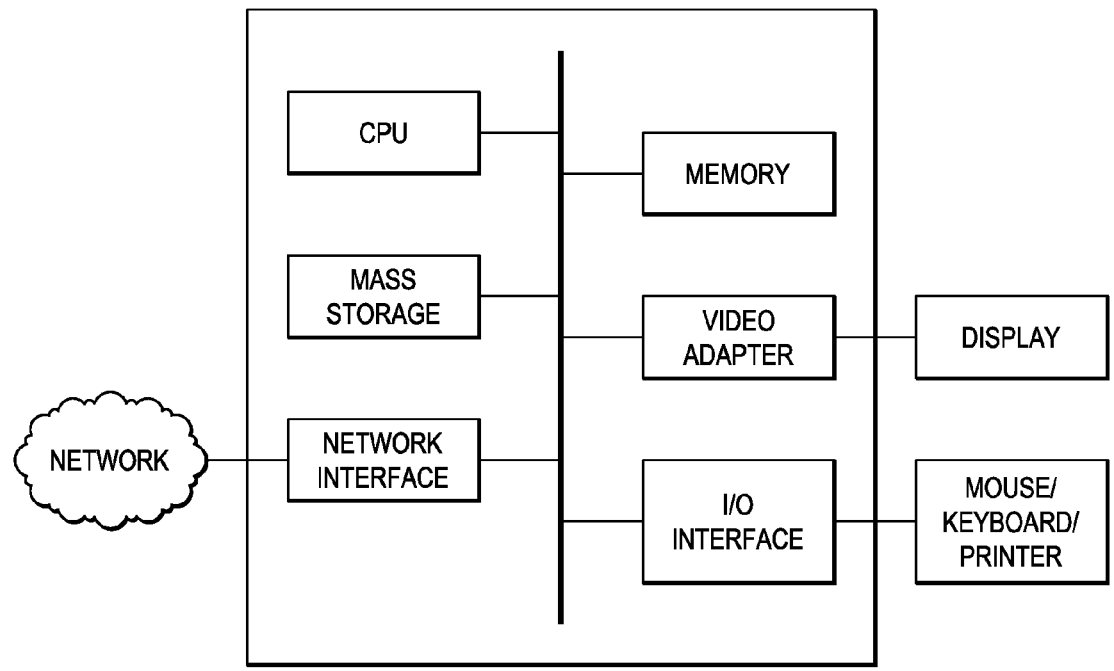
FIG. 12 illustrates a diagram of an embodiment computing platform.

FIG. 12 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 13:
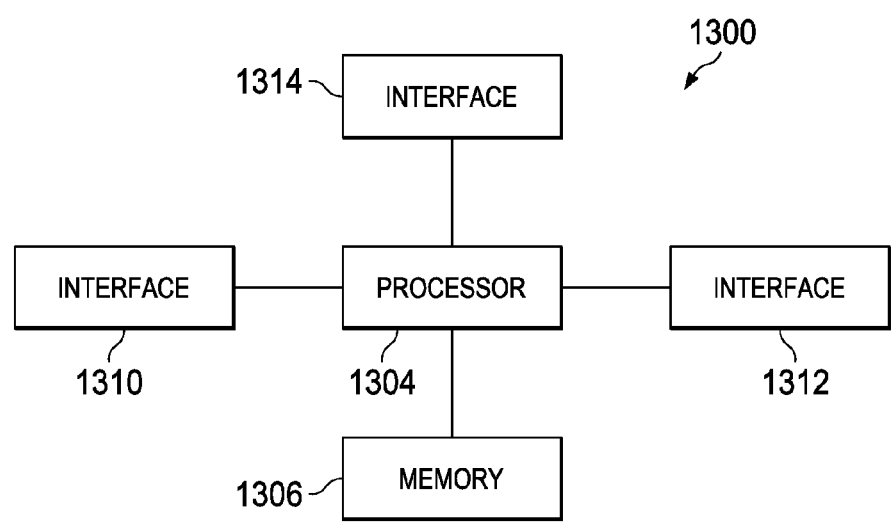
FIG. 13 illustrates a diagram of an embodiment communications device.

FIG. 13 illustrates a block diagram of an embodiment of a communications device 1300, which may be equivalent to one or more devices (e.g., UEs, NBs, etc.) discussed above. The communications device 1300 may include a processor 1304, a memory 1306, and a plurality of interfaces 1310, 1312, 1314, which may (or may not) be arranged as shown in FIG. 13. The processor 1304 may be any component capable of performing computations and/or other processing related tasks, and the memory 1306 may be any component capable of storing programming and/or instructions for the processor 1304. The interfaces 1310, 1312, 1314 may be any component or collection of components that allows the communications device 1300 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for dual-homed external access in a virtual edge router, the method comprising:
receiving a packet on a local area network (LAN) interface of a local host device in the virtual edge router;
searching a routing table to identify a remote outgoing interface associated with a destination address of the packet, wherein the destination address of the packet corresponds to an external destination in a private network, and wherein the remote outgoing interface interconnects the private network to a remote host device of the virtual edge router;
determining whether the destination address that is associated with the remote outgoing interface is also associated with a local outgoing interface of the local host device after identifying the remote outgoing interface associated with the destination address; and
forwarding the packet over the local outgoing interface of the local host device without forwarding the packet to the remote outgoing interface when the destination address is associated with both the local outgoing interface of the local host device and the remote outgoing interface.

2. The method of claim 1, further comprising:
forwarding the packet over a data tunnel when the destination address is not associated with any local outgoing interfaces of the local host device, wherein the data tunnel interconnects a wide area network (WAN) interface of the local host device to a WAN interface of the remote host device.

3. The method of claim 2, wherein the data tunnel is established through a wide area network.

4. The method of claim 2, wherein the data tunnel is established through a public network.

5. The method of claim 2, wherein the data tunnel is established through a public internet.

6. The method of claim 1, wherein the private network is communicatively coupled to the local host device via the local outgoing interface and to the remote host device via the remote outgoing interface.

7. The method of claim 6, wherein the private network is a multi-protocol label switching (MPLS) network.

8. A computer program product for operating a virtual forwarding unit of a virtual edge router, the computer program product comprising a non-transitory computer readable storage medium storing programming that includes instructions to:
receive a packet on a local area network (LAN) interface of a local host device in the virtual edge router;
search a routing table to identify a remote outgoing interface associated with a destination address of the packet, wherein the destination address of the packet corresponds to an external destination in a private network, and wherein the remote outgoing interface interconnects the private network to a remote host device of the virtual edge router;
determine whether the destination address that is associated with the remote outgoing interface is also associated with a local outgoing interface of the local host device after identifying the remote outgoing interface associated with the destination address; and
forward the packet over the local outgoing interface of the local host device without forwarding the packet to the remote outgoing interface when the destination address is associated with both the local outgoing interface of the local host device and the remote outgoing interface.

9. The computer program product of claim 8, wherein the programming further includes instructions to:
forward the packet over a data tunnel when the destination address is not associated with any local outgoing interfaces of the local host device, wherein the data tunnel interconnects a wide area network (WAN) interface of the local host device to a WAN interface of the remote host device.

10. The computer program product of claim 9, wherein the data tunnel is established through a wide area network.

11. The computer program product of claim 9, wherein the data tunnel is established through a public network.

12. The computer program product of claim 9, wherein the data tunnel is established through a public internet.

13. The computer program product of claim 9, wherein the private network is communicatively coupled to the local host device via the local outgoing interface and to the remote host device via the remote outgoing interface.

14. The computer program product of claim 13, wherein the private network is a multi-protocol label switching (MPLS) network.

15. A method for expedited private network re-routing in a virtual edge router, the method comprising:
receiving a packet on a local area network (LAN) interface of a local host device in the virtual edge router;
searching a routing table to identify a remote internal interface associated with a destination address of the packet, wherein the remote internal interface is a port on a remote host device of the virtual edge router, and wherein a data tunnel interconnects a wide area network (WAN) interface of the local host device to a WAN interface of the remote host device, the data tunnel extending through a public network;

determining, by the local host device, whether to re-route the packet over a private network according to a flag in a routing table, the flag being set or cleared by a virtual controller of the virtual edge router, the virtual controller being separate and distinct from the local host device, wherein the private network is interconnected to the remote host device via a remote outgoing interface and to the local host device via a local outgoing interface; and forwarding the packet over the local outgoing interface when determining to reroute the packet over the private network.

16. The method of claim 15, further comprising:
forwarding the packet over the data tunnel when determining not to reroute the packet over the private network.

17. The method of claim 15, wherein determining whether to re-route the packet over the private network comprises:
determining to reroute the packet over the private network when a connection speed of the public network is below a threshold.

18. The method of claim 15, wherein the private network is a multi-protocol label switching (MPLS) network.

19. The method of claim 15, wherein the public network is a public internet.

* * * * *